(12) United States Patent
Burchardt et al.

(10) Patent No.: US 11,353,003 B2
(45) Date of Patent: Jun. 7, 2022

(54) WIND TURBINE BLADE AND WIND TURBINE

(71) Applicant: Siemens Gamesa Renewable Energy A/S, Brande (DK)

(72) Inventors: Claus Burchardt, Gistrup (DK); Soeren Randrup Daugaard Henrichsen, Vodskov (DK); Ashish Pawar, Aalborg (DK)

(73) Assignee: SIEMENS GAMESA RENEWABLE ENERGY A/S

( * ) Notice: Subject to any disclaimer, the term of this patent is extended or adjusted under 35 U.S.C. 154(b) by 0 days.

(21) Appl. No.: 16/834,349

(22) Filed: Mar. 30, 2020

(65) Prior Publication Data
US 2020/0318605 A1 Oct. 8, 2020

(30) Foreign Application Priority Data

Apr. 3, 2019 (EP) .................................... 19167131

(51) Int. Cl.
*F03D 1/06* (2006.01)
*F03D 80/30* (2016.01)

(52) U.S. Cl.
CPC ........... *F03D 1/0675* (2013.01); *F03D 80/30* (2016.05); *F05B 2240/30* (2013.01); *Y02E 10/72* (2013.01)

(58) Field of Classification Search
CPC ....... F03D 1/0675; F03D 80/30; Y02E 10/72; F05B 2240/30
See application file for complete search history.

(56) References Cited

U.S. PATENT DOCUMENTS

| 7,651,320 B2* | 1/2010 | Hansen | F03D 80/30 416/1 |
| 8,734,110 B2* | 5/2014 | Kuroiwa | F03D 1/0675 416/146 R |
| 9,689,377 B2* | 6/2017 | Klein | F03D 80/30 |

(Continued)

FOREIGN PATENT DOCUMENTS

| EP | 2791500 A1 | 10/2014 |
| EP | 3184814 A1 | 6/2017 |

(Continued)

OTHER PUBLICATIONS

European Search Report for Application No. 19167131.2, dated Oct. 14, 2019.

*Primary Examiner* — Ryan J. Walters
(74) *Attorney, Agent, or Firm* — Schmeiser, Olsen & Watts LLP (57) ABSTRACT

Provided is a wind turbine blade for a wind turbine, the wind turbine blade including a root, a tip, a trailing edge, a leading edge and at least two beams including carbon fiber-reinforced plastic and being spaced apart from one another, wherein the at least two beams are arranged in the wind turbine blade in the longitudinal direction of the wind turbine blade at the trailing edge or within a distance of 25% of the width from the trailing edge, whereby the at least two beams are electrically connected to one another by at least one electrically conductive member and at least one of the at least two beams and/or at least one of the at least one electrically conductive member is configured to be connected to a down conductor of the wind turbine.

15 Claims, 4 Drawing Sheets

(56) References Cited

U.S. PATENT DOCUMENTS

2014/0301859 A1* 10/2014 Hancock .............. B29C 70/865
                                                    416/230
2019/0003462 A1*  1/2019 Nielsen ................. F03D 80/30
2019/0145383 A1   5/2019 Christiansen et al.

FOREIGN PATENT DOCUMENTS

EP          3483424 A1   5/2019
EP          3597911 A1   1/2020

* cited by examiner

WIND TURBINE BLADE AND WIND TURBINE

CROSS-REFERENCE TO RELATED APPLICATIONS

This application claims priority to EP Application No. 19167131.2, having a filing date of Apr. 3, 2019, the entire contents of which are hereby incorporated by reference.

FIELD OF TECHNOLOGY

The following is directed to a wind turbine blade. Moreover, the following is directed to a wind turbine comprising at least two wind turbine blades.

BACKGROUND

Wind turbine blades must be able to efficiently convert wind into spinning movement of the wind turbine blades, so that energy of the wind can be converted into rotary mechanical movement of a rotor to which the wind turbine blades are attached. It is preferable, to use materials having a high specific modulus, also known as stiffness to weight ratio to minimize the weight of the wind turbine blade and subsequent systems affected by it. Therefore, composite materials such as carbon fiber-reinforced plastic having a high specific modulus are commonly used in wind turbine blades. However, carbon fiber-reinforced plastic, for example, applied in the main spars of wind turbine blades can minimize flap wise deflections of the wind turbine blade. Typically, the main spar cap is made from carbon material and provided with lightning system protection so that damage due to lightning's is avoided. Herein proposed designs of wind turbine blades consider placing carbon at the trailing edge. Lightning system protection at the trailing edge is constrained by the geometry compared to the main spar cap. This geometry can be challenging from material placement prospective or proximity of pressure side and suctions side spar caps that increase risk of arcing.

SUMMARY

Thus, there is still a need for a wind turbine blade with a high specific modulus and low risk of structural failure due to a lightning strike.

According to a first aspect of embodiments of the invention, there is a wind turbine blade for a wind turbine, the wind turbine blade comprising a root, a tip, a trailing edge, a leading edge and at least two beams comprising carbon fiber-reinforced plastic, the at least two beams being spaced apart from one another, whereby the wind turbine blade has a width measured in a width direction from the trailing edge to the leading edge, wherein the at least two beams are arranged in the wind turbine blade in the longitudinal direction of the wind turbine blade at the trailing edge or within a distance of one of 25%, in particular of 20%, of 15% and 10% of the width from the trailing edge, whereby the at least two beams are electrically connected to one another by means of at least one electrically conductive member and at least one of the at least two beams and/or at least one of the at least one electrically conductive member is configured to be connected to a down conductor of the wind turbine.

By means of the at least one electrically conductive member, the risk of arcing between the electrically separated beams having little distance between them is significantly reduced and the lightning concept is simplified. Still, there is a high design freedom due to the beams being spaced apart from one another.

That the at least two beams are spaced apart from one another in particular means that they are physically not directly connected to one another. Thus, no current can directly be carried from one of the beams to another one of the beams. However, the beams are typically arranged at the shell, which however, is made from a non-conductive material such as glass fiber-reinforced plastic or a material that has very little electrical conductivity. Thereby, the at least two beams are typically indirectly physically connected to one another by means of the shell. Thereby, in particular, the spacing apart of the beams means that the beams are electrically separated from one another. The beams are electrically connected to one another only by means of the at least one electrically conductive member.

The wind turbine blade in particular comprises a shell and at least one spar having at least one spar cap. Typically, the shell has or is forming the root, the tip, the trailing edge and the leading edge of the wind turbine blade. The spar is typically arranged to provide optimum stiffness to in a middle part inside of the wind turbine blade. The down conductor may be a down conductor of the wind turbine blade or at least partially arranged at the wind turbine blade. At least one of the at least two beams and/or at least one of the at least one electrically conductive member may be connected to the down conductor of the wind turbine blade.

Typically, the wind turbine blade has a shape in which the width of the wind turbine blade varies along a length of the wind turbine blade measured in a longitudinal direction from the root to the tip. In this case, the at least two electrically separated beams are arranged in the wind turbine blade in the longitudinal direction of the wind turbine blade at the trailing edge or within one of a distance of 25%, in particular of 20%, of 15% and of 10% of at least one of the varying widths from the trailing edge. However, the at least two electrically separated beams may also be arranged in the wind turbine blade in the longitudinal direction of the wind turbine blade at the trailing edge or within one of a distance of 25%, in particular of 20%, of 15% and of 10% of the varying widths from the trailing edge along at least 30%, at least 50% and at least 80% of the length of the wind turbine blade.

The beams comprising carbon fiber-reinforced plastic may be made from carbon fiber-reinforced plastic or a hybrid fiber-reinforced plastic comprising carbon fiber-reinforced plastic. The hybrid-fiber reinforced plastic may comprise one of at least 30%, at least 50% and at least 70% carbon fiber-reinforced plastic as fiber-reinforced plastic by volume. The beams may be made from prepregs.

The beam can be defined as an elongate structure having high tensile strength. The beam may alternatively be referred to as a strip, a band, a laminate or a bar, for example. Such beams or strips may be stacked on top of one another to further increase the tensile strength and make the beam or strip flexible against torsional load.

In a preferred embodiment of the invention, at least one of the at least one electrically conductive member is a flexible electrically conductive strip. This is in particular for ease in material placement. The flexible electrically conductive strip may be bend easily without breaking so that the electrical connection between the electrically separated beams is facilitated. Especially, it is easily possible to provide the flexible electrically conductive strip at positions of the trailing edge of the wind turbine blade having a complex geometry. Moreover, the trailing edge of the wind turbine blade is typically subjected to high torsional loads and thus the flexible electrically conductive strip has a high resistance against such loads and is unlikely to break.

In a further preferred embodiment of the invention, at least one of the at least one electrically conductive member is arranged at the outer circumference of the trailing edge. The electrically conductive member for this purpose may be arranged within or outside of the wind turbine blade. In particular, the electrically conductive member may be arranged at least partially or entirely within the shell of the wind turbine blade. However, the shape of the electrically conductive member thereby follows the shape of the trailing edge or internals of the wind turbine blade. Thereby, the electrically conductive member can be led along the trailing edge. Thereby, the electrically conductive member can easily be fixed within or outside of the wind rotor blade, which in effect simplifies the manufacturing of the wind turbine blade. Further, a chance that the electrically conductive member itself intercepts the lightning strike is increased, so that the risk of arcing is further reduced.

In another preferred embodiment of the invention, at least one of the at least one electrically conductive member is a carbon fiber roving or a copper mesh. Thereby, a high conductivity of the electrically conductive members is provided reducing the probability of arcing because the current from a lightning strike is more likely to go the way of lowest electrical resistance. In particular, the electrically conductive member may have an electrical conductivity higher than the electrical conductivity of the beams.

In yet another preferred embodiment of the invention, at least one of the at least one electrically conductive member has a length measured in the longitudinal direction of one of at least 3%, at least 5% and at least 10% and of at least 20% of the length of the wind turbine blade. Thereby, a greater surface of the electrically conductive member is provided which translates into better current-carrying capabilities.

In yet a further preferred embodiment of the invention, the wind turbine blade comprises several electrically conductive members and adjacent electrically conductive members are arranged at a distance of one of 0.1% to 5%, of 0.3% to 4% and of 0.5% to 3% of the length of the wind turbine blade from one another. Thereby, material of the electrically conductive members can be saved along the entire wind turbine blade without notably reducing the current-carrying capabilities between the beams.

In a moreover preferred embodiment of the invention, at least one of the at least two beams are arranged at the trailing edge or within one of a distance of 3%, of 2% and of 1% of the width of the wind turbine blade from the trailing edge. Thereby, the stiffness of the wind turbine blade is significantly increased because the stiffness of the wind turbine blade increases at a cubic rate as a function of the distance from the neutral axis of the wind turbine blade.

In a furthermore preferred embodiment of the invention, at least one of the at least two beams arranged at the trailing edge or within one of a distance of 3% of the width of the wind turbine blade from the trailing edge is at a distance of 3% to 15%, of 4% to 13% and of 5% to 10% of the width of the wind turbine blade from any other of the at least two beams. Thereby, a high stiffness can be provided at different positions at or close to the trailing edge while effectively reducing the likelihood of arcing between the beams.

In a further preferred embodiment of the invention, at least two of the at least two beams are arranged opposite to one another. In particular, the beams are arranged opposite to one another in a thickness direction of the wind turbine blade, wherein the thickness direction is orthogonal to the longitudinal direction and orthogonal to the width direction of the wind turbine blade. Thereby, the stiffness increase by means of the beams is facilitated on both blade panels of the wind turbine blade.

In another preferred embodiment of the invention, the wind turbine blade comprises at least three electrically separated beams, wherein the beams are arranged in the longitudinal direction of the wind turbine blade within one of a distance of 25%, particularly 20%, 15% and 10% of the width from the trailing edge. This enables provision of different stiffness characteristics along the wind turbine blade.

In a preferred embodiment of the invention, each of at least two of the at least three beams are electrically connected to another one of the at least three beams by means of at least one electrically conductive member. In other words, the beams are electrically connected with each other by separate electrically conductive member. Thereby, the overall current-carrying capabilities are increased, because one electrically conductive member can only carry current from one beam to another beam but not between more than two beams.

In a further preferred embodiment of the invention, the two beams electrically connected to the another one of the at least three beams by means of the at least one electrically conductive member are otherwise not electrically connected to each other. Thereby, there is no redundancy between the beams which would make it uncertain which way the current of a lightning strike would go. Instead, the path of the current is predetermined so that the current may be directly carried to the down conductor of the wind turbine or the wind turbine blade.

In yet another preferred embodiment of the invention, the wind turbine blade has at least one first longitudinal section in its longitudinal direction comprising at least one of the at least three beams and at least one second longitudinal section in its longitudinal direction comprising at least two other of the at least three beams, which are not provided in the at least one first longitudinal section, whereby the beams are connected to one another by means of the at least one electrically conductive member at longitudinal end portions of the beams. Moreover, thereby efficient use of material may be facilitated. For example, near the root, where the geometry of the wind turbine blade is typically circular, only one beam may be used whereas in an area of the wind turbine blade, where the wind turbine blade has an airfoil shape, two or more beams may be used. Further it becomes possible to provide the wind turbine blade with longitudinal sections having different stiffness characteristics. For example, at a position of the wind turbine blade where high flexibility is demanded, there may be several beams of relatively low stiffness arranged in the wind turbine blade. At a position of the wind turbine blade where high stiffness is demanded, such as at the trailing edge, there may be only a single beam of relatively high stiffness arranged in the wind turbine blade.

In yet a further embodiment of the invention, the at least one first longitudinal section and the at least one second longitudinal section are partially overlapping each other in an overlapping section, in which the beams are provided and connected to one another by means of the at least one electrically conductive member at longitudinal end portions of the beams. In this context, overlapping does not mean that the beams of the longitudinal sections would be physically touching each other. Instead, overlapping means, that the longitudinal sections are provided in the same portion along the length of the wind turbine blade. Thus, the stiffness transition from one longitudinal section to another longitudinal section may be provided through the shell at the overlapping section of the wind turbine blade, to which the beams may be attached.

According to a second aspect of embodiments of the invention, there is a wind turbine comprising at least one wind turbine blade according to the first aspect of embodiments of the invention.

BRIEF DESCRIPTION

Some of the embodiments will be described in detail, with reference to the following figures, wherein like designations denote like members, wherein.

Same objects in FIGS. 1 to 7 are denominated with the same reference number. If there is more than one object of the same kind in one of the figures, the objects are numbered in ascending order with the ascending number of the object being separated from its reference number by a dot.

DETAILED DESCRIPTION

Figure 1:
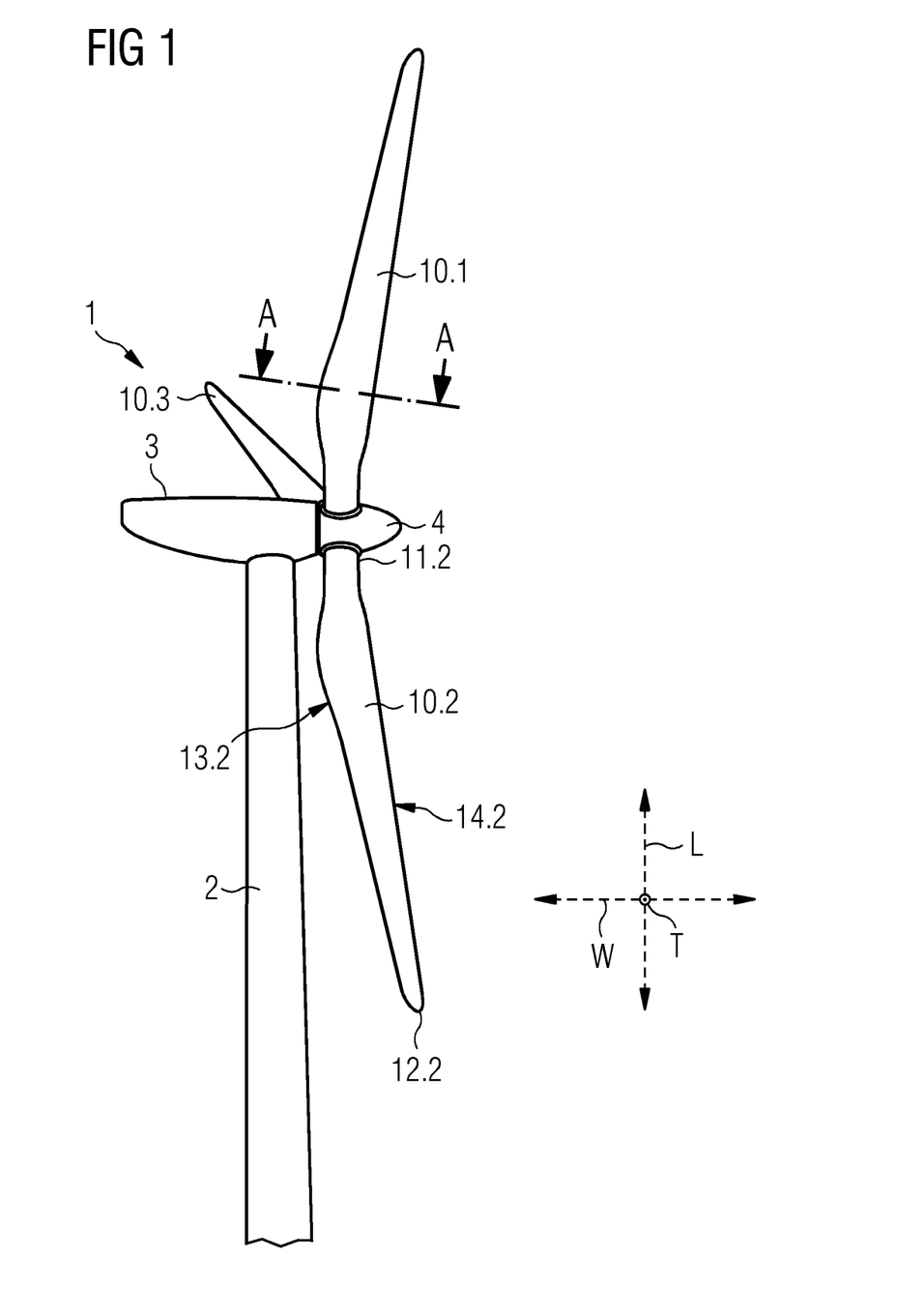
FIG. 1 shows a side perspective view of an embodiment of a wind turbine according to the invention.

FIG. 1 is a side view on an embodiment of a wind turbine 1 according to embodiments of the invention. The wind turbine 1 is provided with three wind turbine blades 10.1, 10.2, 10.3 attached to a hub 4 of the wind turbine 1, wherein the hub 4 is connected to a nacelle 3 of the wind turbine 1 and the nacelle 3 is supported on a mast 2 of the wind turbine 1. The wind turbine blade 10.2 has a root 11.2 and a tip 12.2. The wind turbine blade 10.2 further has a trailing edge 13.2 and a leading edge 14.2. The leading edge 14.2 is the part of the wind turbine blade 10.2 that contacts the air first in operation of the wind turbine 1. The trailing edge 13.2 is the wind turbine blade's 10.2 rear edge, which controls the direction of the departing air flow. The wind turbine blades 10.1 and 10.3 have the same structure as the wind turbine blade 10.2 in this particular embodiment.

Figure 2:
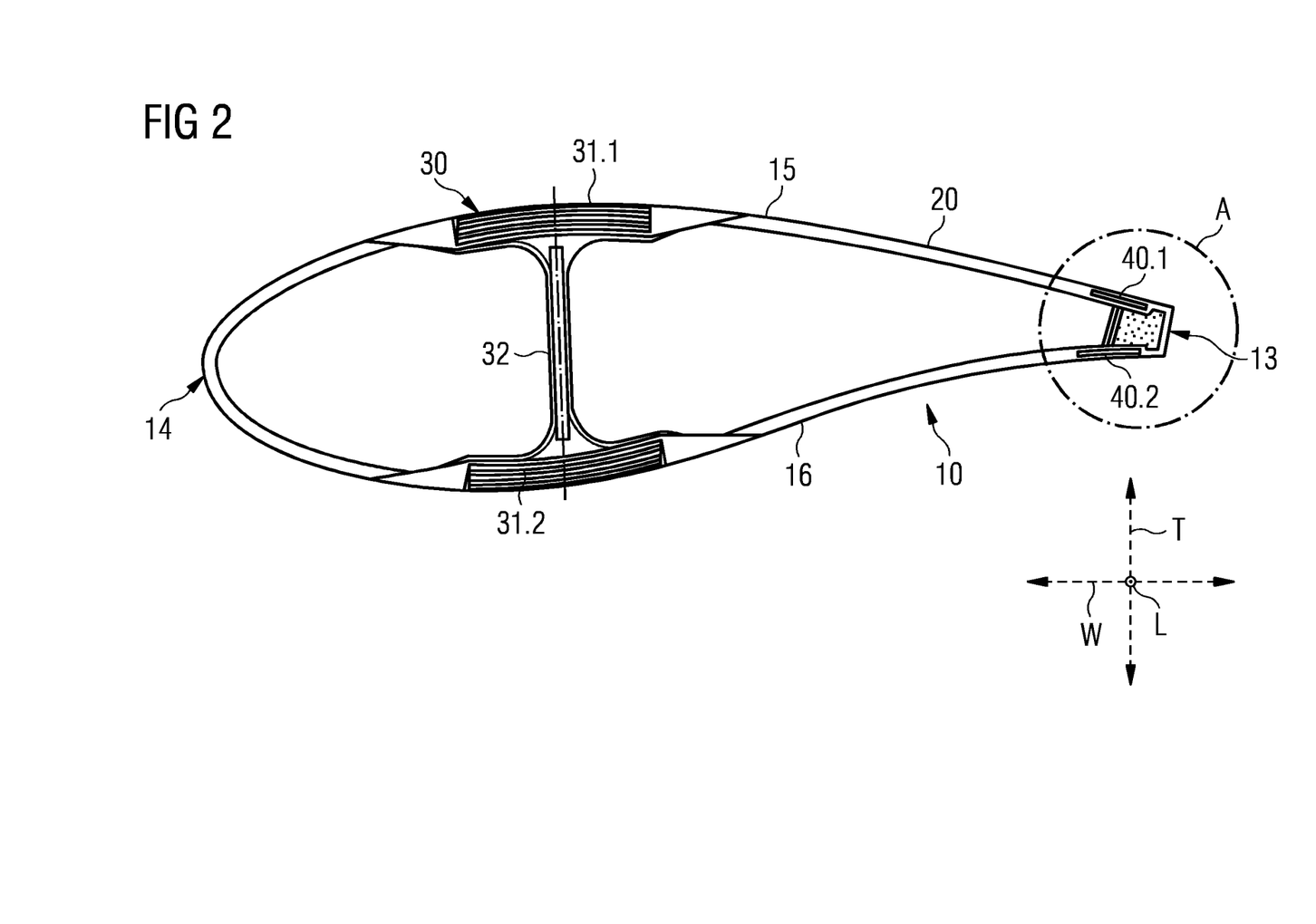
FIG. 2 shows a sectional view along a transversal plane of a first embodiment of a wind turbine blade according to the invention of the wind turbine from FIG. 1.

FIG. 2 is a sectional view along the transversal plane of line A-A depicted in FIG. 1 of the wind turbine blade 10.1 of the wind turbine 1 of FIG. 1. The wind turbine blade 10.1 comprises a shell 20 and a spar 30. The spar 30 comprises two spar caps 31.1, 31.2, in this specific embodiment. The two spar caps 31.1, 31.2 are arranged opposite to each other within or at the shell 20 and are connected to one another by means of a spar web 32 forming a so-called I-beam. However, alternative structures of the spar 30 are possible, such as a rectangular spar beam or a C-beam. The spar caps 31.1, 31.2 may comprise a number of beams or strips comprising carbon fiber-reinforced plastic stacked on top of one another.

The length of the wind turbine blade 10 is measured in its longitudinal direction L along the longitudinal axis indicated by the shown coordinate system. The width of the wind turbine blade 10 is measured in a width direction W along the indicated width axis. As can be seen in FIG. 1, the width of the wind turbine blades 10.1, 10.2, 10.3 varies along the length of the wind turbine blade measured in the longitudinal directions of the wind turbine blades 10.1, 10.2, 10.3. The thickness of the wind turbine blade 10 is measured in a thickness direction T along the indicated thickness axis.

Two spaced apart beams 40.1, 40.2 are arranged in the wind turbine blade 10 in the longitudinal direction of the wind turbine blade 10 at a distance of 10% of the width from the trailing edge 13. This is further explained with reference to FIG. 3, which shows the detail A of a portion of the wind turbine blade 10 comprising the trailing edge 13 of the wind turbine blade 10 from FIG. 2.

Figure 3:
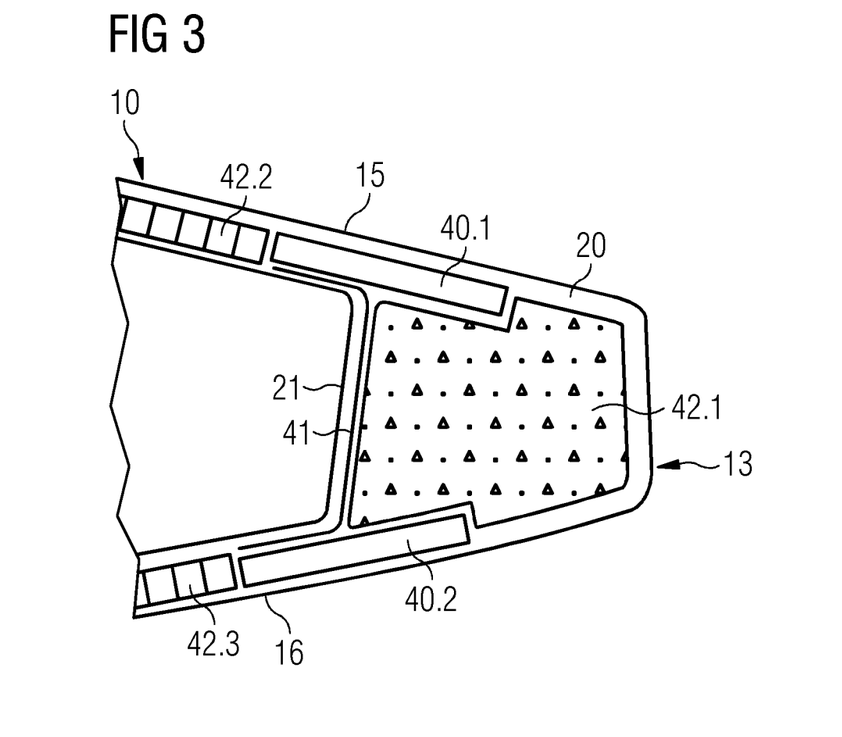
FIG. 3 shows a sectional view of a portion of the wind turbine blade from FIG. 2.

FIG. 3 shows the detail A of a portion of the wind turbine blade 10 comprising the trailing edge 13 of the wind turbine blade 10 from FIG. 2. The beams 40.1, 40.2 are arranged within the shell 20 of the wind turbine blade 10. The beams 40.1, 40.2 are arranged opposite to one another in the thickness direction T of the wind turbine blade 10. An electrically conductive member 41 is connecting the beams 40.1, 40.2 with each other so that in the case of a lightning striking any of the beams 40.1, 40.2 it does not come to arcing between the beams 40.1, 40.2. Such an arcing might damage the beams 40.1, 40.2 and in turn the wind turbine blade 10 and is prevented by means of the electrically conductive member 41.

In this particular embodiment, the electrically conductive member 41 is a flexible electrically conductive strip. The electrically conductive member 41 has the shape of a C or substantially a C. Two end portions of the electrically conductive member 41 are contacting bottom surfaces of the beams 40.1, 40.2. The bottom surfaces of the beams 40.1, 40.2 face each other. The electrically conductive member 41 resides in a blade panel connecting part 21 of the shell 20. The blade panel connecting part 21 is connecting an upper blade panel 15 with a lower blade panel 16 of the wind turbine blade 10 at a distance from the trailing edge 13. The blade panels 15, 16 are formed by the shell 20. The blade panel connecting part 21 and the shell 20 form a cavity at the trailing edge 13 of the wind turbine blade 10, in which a reinforcement foam 43.1 is contained. The reinforcement foam 43.1 gives support to the shell 20 and maintains the shape of the trailing edge 13 when forces act upon the shell 20. Further reinforcement foams 43.2, 43.3 are contained in the shell 20 of the blade panels 15, 16. The reinforcement foams 41.1, 42.2, 42.3 may comprise or be made from polyurethane or balsa, for example. The shell 20 may comprise or be made from glass fiber-reinforced plastic, for example.

Figure 4:
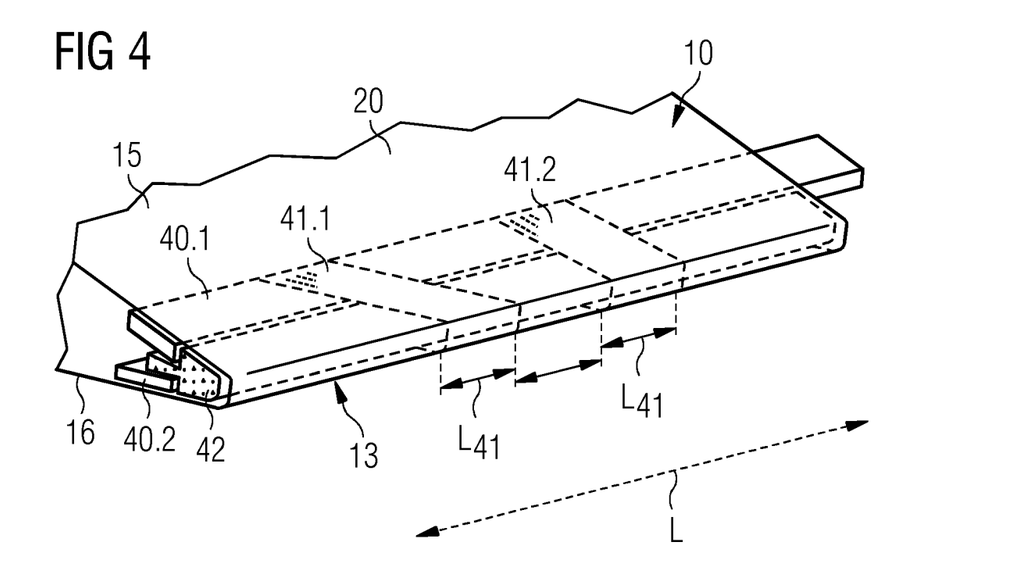
FIG. 4 shows a side perspective view on a portion of the wind turbine blade according to a second embodiment of the invention.

FIG. 4 shows a side perspective view on a portion of the wind turbine blade 10 according to a second embodiment of the invention. Here, two electrically conductive members 41.1, 41.2 arranged at the outer circumference of the trailing edge 13 of the wind turbine blade 10. At least one of the electrically conductive members 41.1, 41.2 may be arranged transversely to the longitudinal direction L of the wind turbine blade 10 at the wind turbine blade 10, as shown in this particular embodiment. Each of the electrically conductive members 41.1, 41.2 has a length $L_{41}$ of 3% of the length of the wind turbine blade 10 and the electrically conductive members 41.1, 41.2 are arranged at a distance $S_{41}$ of 0.5% of the length of the wind turbine blade 10 from one another. The electrically conductive members 41.1, 41.2 thereby connect to top surfaces of the beams 40.1, 40.2. The top surfaces of the beams 40.1, 40.2 face towards opposite directions. Alternatively, or additionally, it is possible to connect the bottom surfaces of the beams 40.1, 40.2. The electrically conductive members 41.1, 41.2 may be disposed inside the shell 20 and thereby be wrapped around the trailing edge 13, as can be seen in FIG. 4.

In contrast to the wind turbine blade 10 of FIG. 2, the wind turbine blade 10 does not comprise the blade panel connecting part 21. However, the reinforcement foam 42 is contained in the inside of the wind turbine blade 10 at the trailing edge 13. However, it is possible to arrange the blade panel connecting part 21 at the reinforcement foam 42 and add a further electrically conductive member 41 inside the blade panel connecting part 21 and contact this to the bottom surfaces of the beams 40.1, 40.2 to thereby provide a redundancy in the electrical connection of the beams 40.1, 40.2. In this particular embodiment, there are no further reinforcement foams in the shell 20.

Figure 5:
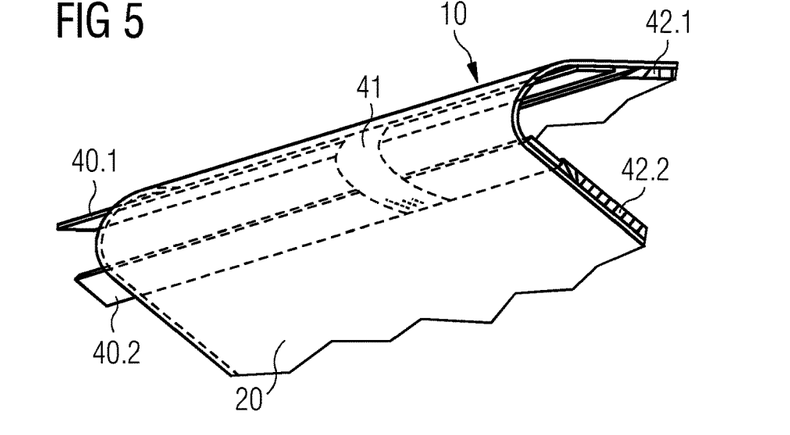
FIG. 5 shows a side perspective view on a portion of the wind turbine blade according to a third embodiment of the invention.

FIG. 5 shows a side perspective view on a portion of the wind turbine blade 10 according to a third embodiment of the invention. Here, the electrically conductive member 41 is arranged at the outer circumference of the trailing edge 13 of the wind turbine blade 10 as shown in FIG. 4. However, there are reinforcement foams 42.1, 42.2 provided in the shell 20 and there is no reinforcement foam 42 at the trailing edge 13.

Figure 6:
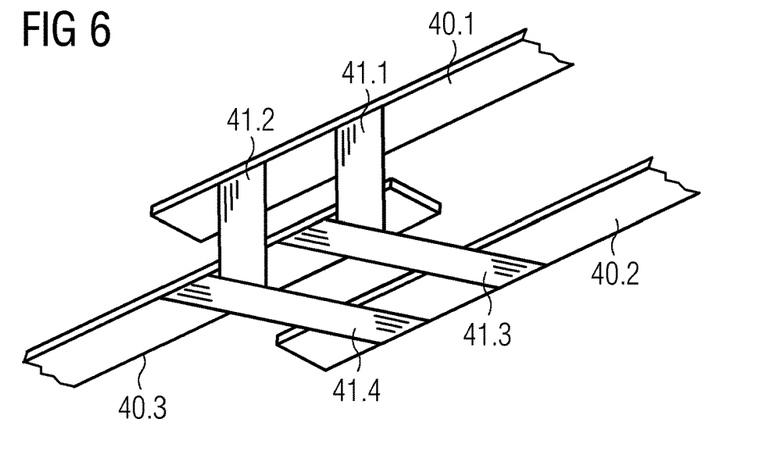
FIG. 6 shows a side perspective view on the electrical connection of three beams for a wind turbine blade by means of electrically conductive members.

FIG. 6 shows a side perspective view on connecting three beams 40.1, 40.2, 40.3 for a wind turbine blade 10 by means of electrically conductive members 41.1, 41.2, 41.3, 41.4. The beam 40.1 is electrically connected to the beam 40.3 by means of the electrically conductive members 41.1, 41.2. The beam 40.2 is electrically connected to the beam 40.3 by means of the electrically conductive members 41.3, 41.4. The beams 40.1, 40.2 are otherwise not electrically connected with one another but only by means of the electrically conductive members 41.1, 41.2, 41.3, 41.4 via the beam 40.3.

Figure 7:
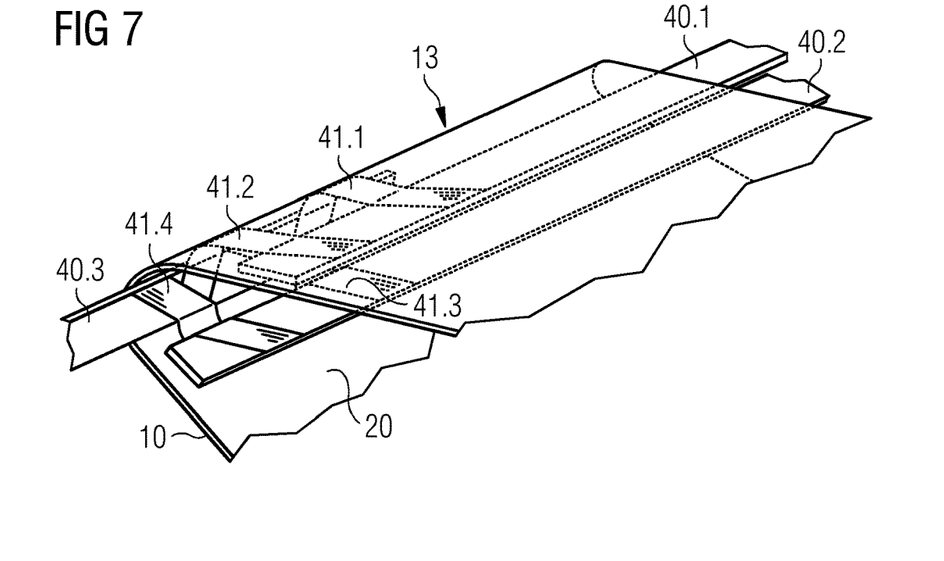
FIG. 7 shows a side perspective view on the electrical connection of FIG. 6 in a portion of the wind turbine blade according to a fourth embodiment of the invention.

FIG. 7 shows a side perspective view on the connection of FIG. 6 in a portion of a wind turbine blade 10 according to a fourth embodiment of the invention. Here, the wind turbine blade 10 comprises the three electrically separated beams 40.1, 40.2, 40.3 of FIG. 6, wherein the beams 40.1, 40.2 are arranged opposite to each other and in the longitudinal direction of the wind turbine blade 10 at a distance of 10% of the width of the wind turbine blade 10 from the trailing edge 13. The beam 40.3 is arranged at the trailing edge 13. The two beams 40.1, 40.2 are part of a first longitudinal section of the wind turbine blade 10 and the beam 40.3 forms a second longitudinal section of the wind turbine blade 10. The beams 40.1, 40.2, 40.3 are connected to one another by means of the electrically conductive members 41.1, 41.2, 41.3, 41.4 at longitudinal end portions of the beams 40.1, 40.2, 40.3. The first longitudinal section and the second longitudinal section are partially overlapping each other in an overlapping section, in which the beams 40.1, 40.2, 40.3 are provided and connected to one another by means of the electrically conductive members 41.1, 41.2, 41.3, 41.4 at the longitudinal end portions of the beams 40.1, 40.2, 40.3.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A wind turbine blade for a wind turbine, the wind turbine blade comprising a root, a tip, a trailing edge, a leading edge and at least two beams having carbon fiber-reinforced plastic and being spaced apart from one another, wherein the wind turbine blade has a width measured in a width direction from the trailing edge to the leading edge, wherein the at least two beams are arranged in the wind turbine blade in the longitudinal direction of the wind turbine blade at the trailing edge or within a distance of 25% of the width from the trailing edge, wherein the at least two beams are electrically connected to one another by means of at least one electrically conductive member and wherein at least one of the at least two beams and/or at least one of the at least one electrically conductive member is configured to be connected to a down conductor of the wind turbine.

2. The wind turbine blade according to claim 1, wherein
at least one of the at least one electrically conductive member is a flexible electrically conductive strip.

3. The wind turbine blade according to claim 1, wherein
at least one of the at least one electrically conductive member is arranged at the outer circumference of the trailing edge.

4. The wind turbine blade according to claim 1, wherein
at least one of the at least one electrically conductive member is a carbon fiber roving or a copper mesh.

5. The wind turbine blade according to claim 1, wherein
at least one of the at least one electrically conductive member has a length measured in the longitudinal direction of at least 1% of the length of the wind turbine blade.

6. The wind turbine blade according to claim 1, wherein the wind turbine blade further comprises an adjacent electrically conductive member adjacent to the at least one electrically conductive member, wherein the at least one electrically conductive member and the adjacent electrically conductive member are arranged at a distance of 0.1% to 5% of the length of the wind turbine blade from one another.

7. The wind turbine blade according to claim 1, wherein at least one of the at least two beams is arranged at the trailing edge or within a distance of 3% of the width of the wind turbine blade from the trailing edge.

8. The wind turbine blade according to claim 7, wherein
the at least one of the at least two beams arranged at the trailing edge or within a distance of 3% of the width of the wind turbine blade from the trailing edge is at a distance of 3% to 15% of the width of the wind turbine blade from any other of the at least two beams.

9. The wind turbine blade according to claim 1, wherein at least two of the at least two beams are arranged opposite to one another.

10. The wind turbine blade according to claim 1, wherein the wind turbine blade comprises at least three beams spaced apart from one another, wherein the beams are arranged in the longitudinal direction of the wind turbine blade within a distance of 25% of the width of the wind turbine blade from the trailing edge.

11. The wind turbine blade according to claim 10, wherein
each of at least two of the at least three beams is electrically connected to another one of the at least three beams by means of at least one electrically conductive member.

12. The wind turbine blade according to claim 11, wherein
the two beams electrically connected to the another one of the at least three beams by the at least one electrically conductive member are otherwise not electrically connected to each other.

13. The wind turbine blade according to claim 10, wherein
the wind turbine blade has at least one first longitudinal section in its longitudinal direction comprising at least one of the at least three beams and at least one second longitudinal section in its longitudinal direction comprising at least two other of the at least three beams, which are not provided in the at least one first longitudinal section, wherein the beams are connected to one another by means of the at least one electrically conductive member at longitudinal end portions of the beams.

14. The wind turbine blade according to claim 13, wherein
the at least one first longitudinal section and the at least one second longitudinal section are partially overlapping each other in an overlapping section, in which the beams are provided and connected to one another by the at least one electrically conductive member at the longitudinal end portions of the beams.

15. A wind turbine comprising at least one wind turbine blade, the at least one wind turbine blade having a root, a tip, a trailing edge, a leading edge and at least two beams having carbon fiber-reinforced plastic and being spaced apart from one another, wherein the wind turbine blade has a width measured in a width direction from the trailing edge to the leading edge, wherein the at least two beams are arranged in the wind turbine blade in the longitudinal direction of the wind turbine blade at the trailing edge or within a distance of 25% of the width from the trailing edge, wherein the at least two beams are electrically connected to one another by means of at least one electrically conductive member and wherein at least one of the at least two beams and/or at least one of the at least one electrically conductive member is configured to be connected to a down conductor of the wind turbine.

* * * * *